United States Patent
Chaudhari et al.

(10) Patent No.: US 11,802,525 B2
(45) Date of Patent: Oct. 31, 2023

(54) OUTLET GUIDE VANE

(71) Applicant: General Electric Company, Schenectady, NY (US)

(72) Inventors: Vinod Chaudhari, Bengaluru (IN); Bhaskar Nanda Mondal, Bengaluru (IN); Kishanjit Pal, Bengaluru (IN); Sushilkumar Shevakari, Bengaluru (IN); Ian F. Prentice, Cincinnati, OH (US); Thomas Moniz, Loveland, OH (US); Trevor H. Wood, Clifton Park, NY (US); Kishore Ramakrishnan, Rexford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/647,425

(22) Filed: Jan. 7, 2022

(65) Prior Publication Data
US 2023/0220816 A1 Jul. 13, 2023

(51) Int. Cl.
*F04D 29/36* (2006.01)
*F02K 5/00* (2006.01)
*F04D 19/00* (2006.01)

(52) U.S. Cl.
CPC .............. *F02K 5/00* (2013.01); *F04D 19/002* (2013.01); *F04D 29/36* (2013.01)

(58) Field of Classification Search
CPC ........... F02K 5/00; F04D 19/002; F04D 29/36
See application file for complete search history.

(56) References Cited

U.S. PATENT DOCUMENTS

| | | | |
|---|---|---|---|
| 5,259,187 A | 11/1993 | Dunbar et al. | |
| 9,598,167 B2 | 3/2017 | Grip et al. | |
| 9,920,640 B2 | 3/2018 | Hoeger | |
| 10,385,708 B2 | 8/2019 | Damevin et al. | |
| 11,498,657 B2 * | 11/2022 | Reichert | B64C 11/06 |
| 2010/0014977 A1 * | 1/2010 | Shattuck | B64C 11/16 |
| | | | 416/155 |
| 2015/0213971 A1 | 7/2015 | Wijekoon et al. | |
| 2016/0333729 A1 * | 11/2016 | Miller | F04D 27/0292 |
| 2017/0102006 A1 * | 4/2017 | Miller | F04D 29/522 |
| 2019/0225318 A1 | 7/2019 | Ramakrishnan et al. | |
| 2020/0079513 A1 * | 3/2020 | Pastouchenko | B64D 27/02 |

FOREIGN PATENT DOCUMENTS

| | | |
|---|---|---|
| FR | 3127269 A1 | 3/2023 |
| FR | 3130896 A1 | 6/2023 |
| FR | 3130897 A1 | 6/2023 |

* cited by examiner

*Primary Examiner* — Aaron R Eastman
(74) *Attorney, Agent, or Firm* — Venable LLP; Elizabeth C. G. Gitlin; Michele V. Frank

(57) ABSTRACT

An unducted single fan engine includes a housing having one or more fan blades coupled to the housing and configured to rotate circumferentially. The engine has one or more outlet guide vanes coupled to the housing. Each of the one or more guide vanes has a leading edge portion having a variable leading edge. The engine has one or more actuation devices coupled to each of the one or more outlet guide vanes. The one or more actuation devices are configured to control the variable leading edge of the respective outlet guide vane. The variable leading edge is controllable to vary the pitch, camber, lean angle, or sweep of the respective outlet guide vane.

20 Claims, 13 Drawing Sheets

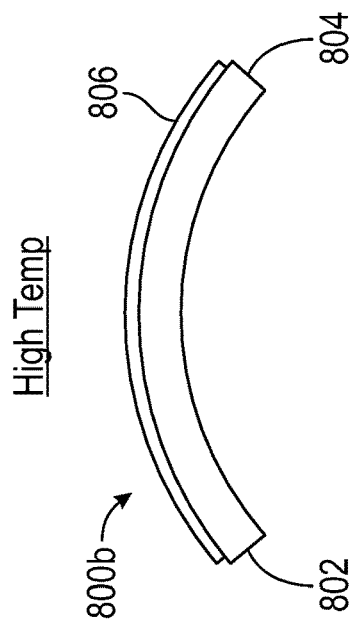
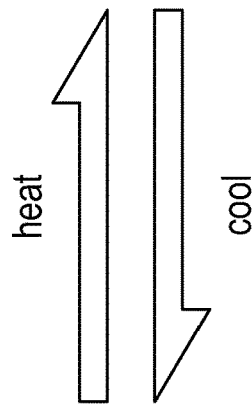
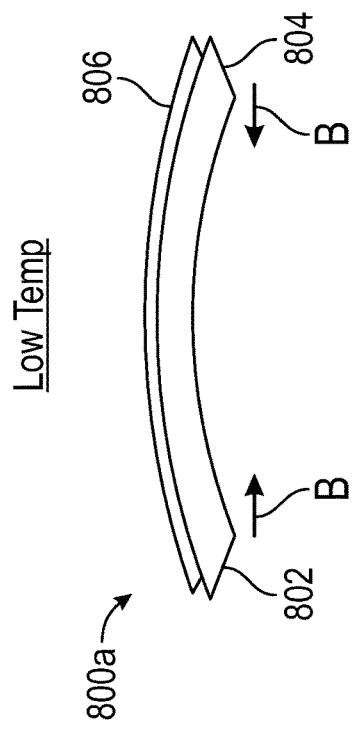

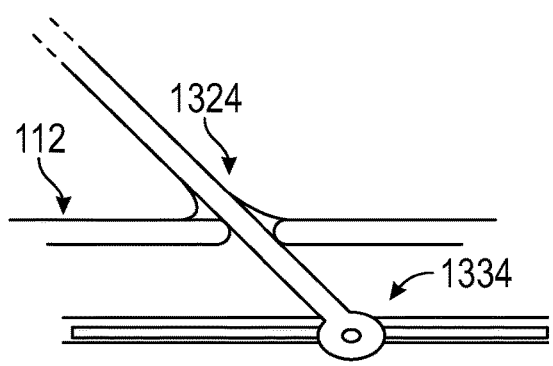
FIG. 17
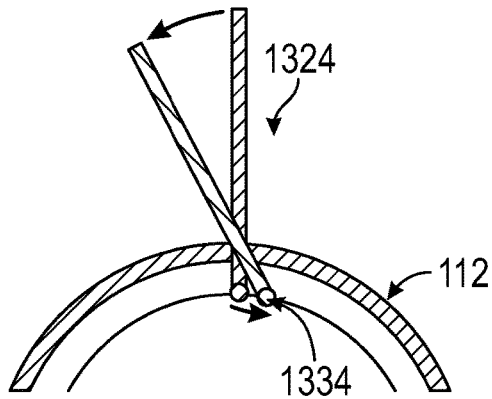
FIG. 18
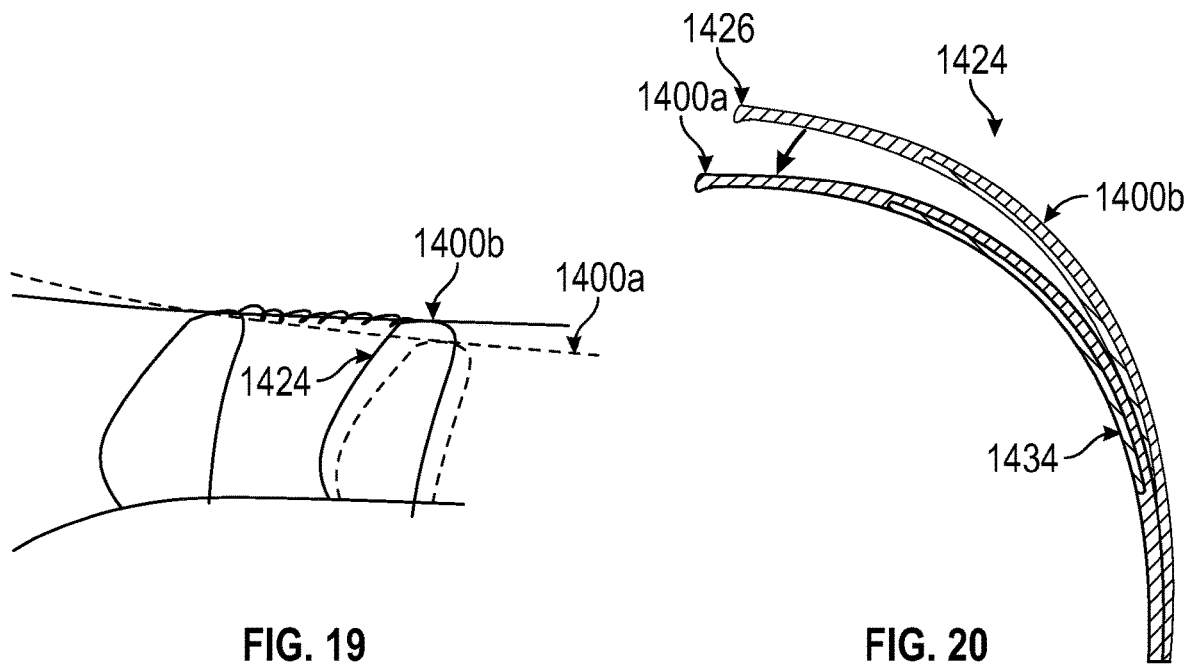
FIG. 19
FIG. 20

OUTLET GUIDE VANE

TECHNICAL FIELD

The present disclosure relates to an outlet guide vane. More particularly, the present disclosure relates to a variable outlet guide vane for an unducted single fan engine.

BACKGROUND

An unducted single fan engine may include fan blades and outlet guide vanes. During operation, the fan blades are rotated around a centerline of the engine. As air passes through the rotating fan blades and the stationary outlet guide vanes, acoustic noise is generated. The outlet guide vanes are configured to pivot with respect to the nacelle to which they are attached in order to optimize the aerodynamic performance and noise between operating conditions.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, and/or structurally similar elements.

FIGS. 10A and 10B show schematic views of a shape memory alloy for use with an outlet guide vane, according to an embodiment of the present disclosure.

FIG. 17 shows a schematic front view of an outlet guide vane of the unducted single fan engine of FIG. 15, according to an embodiment of the present disclosure.

FIG. 18 shows a schematic front view of an outlet guide vane of the unducted single fan engine of FIG. 15, according to an embodiment of the present disclosure.

FIG. 19 shows a schematic partial side view of an unducted single fan engine, according to an embodiment of the present disclosure.

FIG. 20 shows a schematic side view of an outlet guide vane of the unducted single fan engine of FIG. 19, according to an embodiment of the present disclosure.

DETAILED DESCRIPTION

Features, advantages, and embodiments of the present disclosure are set forth or apparent from a consideration of the following detailed description, drawings, and claims. Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

The present disclosure provides an outlet guide vane (OGV) that may be controlled to vary the relative position of the OGV tip with respect to the remaining portion of the OGV and/or to vary the relative position of the OGV to a nacelle on which the OGV is coupled. The outlet guide vane of the present disclosure may allow for variable positioning of portions of the OGV along a given axis. The outlet guide vane of the present disclosure may be controlled to have a variable sweep, variable lean angle or dihedral, variable camber/twist, variable pitch, or any combination thereof. Actuation of the variable control of the outlet guide vane may be provided by an activation device, such as a mechanical activation, electrical activation, or through use of a shape memory alloy, or any combination thereof.

Figure 1A:
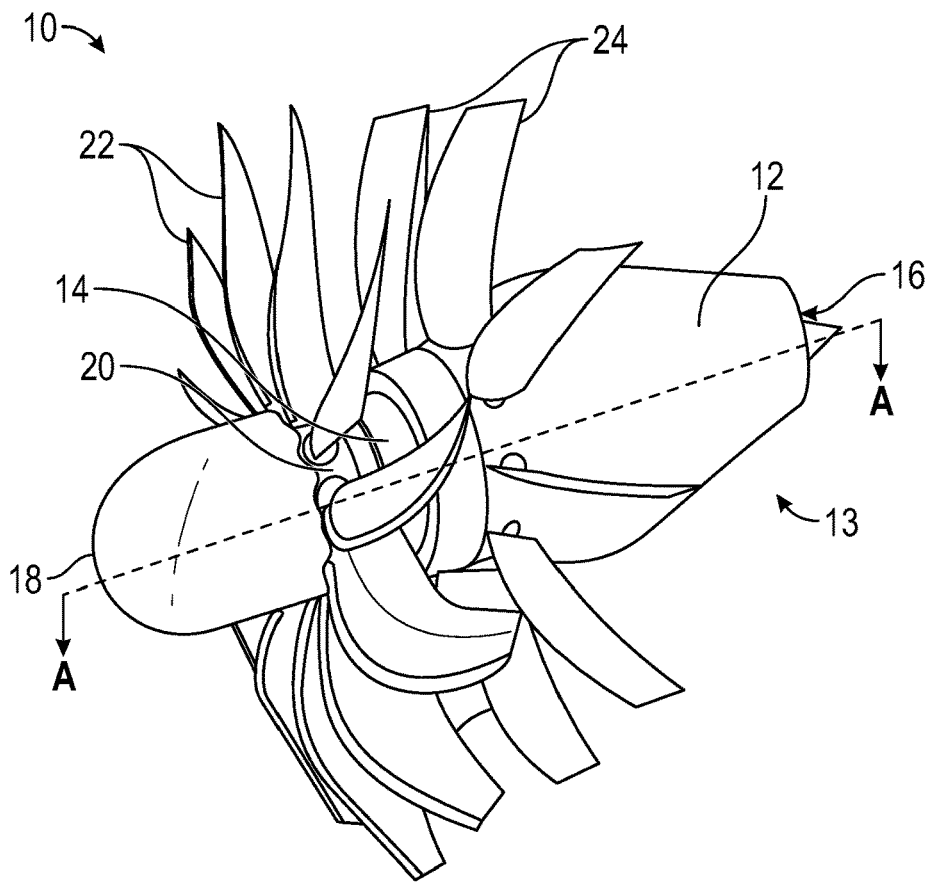
FIG. 1A shows a schematic, perspective view of an unducted single fan engine, according to an embodiment of the present disclosure.
Figure 1B:
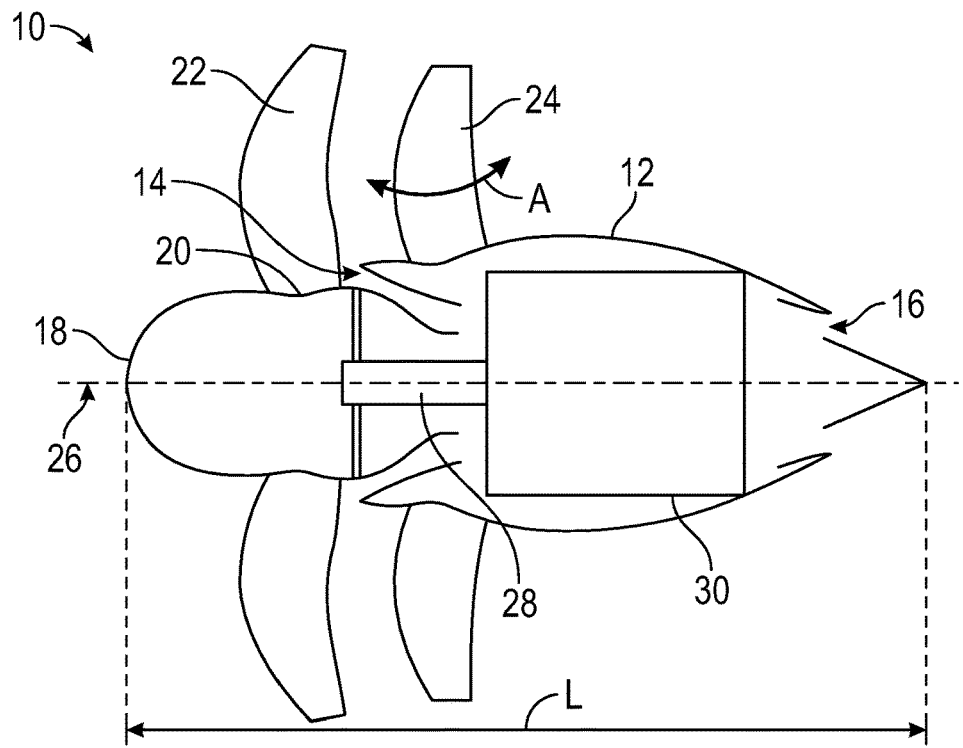
FIG. 1B shows a schematic, cross-sectional view taken along a centerline A-A in FIG. 1A, of the unducted single fan engine of FIG. 1A, according to an embodiment of the present disclosure.

FIGS. 1A and 1B show schematic views of an engine 10, such as, for example, an unducted single fan (USF) engine 10. The engine 10 may include a housing 13. The housing 13 may be formed of a nacelle 12 and a spinner 18. The nacelle 12 and/or the spinner 18 may house internal components of the engine 10. For example, the nacelle 12 may house a torque producing system 30 coupled to a shaft 28. The torque producing system 30 and the shaft 28 may be configured to operate (e.g., to rotate) the spinner 18 to which are coupled one or more fan blades 22. The nacelle 12 may house other components not shown, such as, for example, gear systems, combustion systems, and other known parts of the engine 10. The nacelle 12 may include an engine inlet 14 and an engine outlet 16.

With continued reference to FIGS. 1A and 1B, the nacelle 12 may be coupled to the spinner 18 to form the housing 13. A forward end or front portion of the housing 13 may include the one or more fan blades 22 and one or more outlet guide vanes 24. The spinner 18 may include the one or more fan blades 22 coupled at a fan hub 20. The spinner 18 may rotate with respect to the nacelle 12. Coupled to the nacelle 12 may be the one or more outlet guide vanes (OGV) 24. During operation, the one or more fan blades 22 (by virtue of the connection to the spinner 18) may rotate circumferentially around an engine centerline 26. The nacelle 12 may be stationary such that the one or more outlet guide vanes 24 do not rotate around the engine centerline 26 and are thus stationary with respect to rotation about the engine centerline 26. Although the one or more outlet guide vanes 24 are stationary with respect to the engine centerline 26, the one or more outlet guide vanes 24 are capable of being rotated or moved with respect to the nacelle 12, for example, in a direction A of FIG. 1B.

During operation of the engine 10, air may flow from the left side of FIG. 1B toward the right side of FIG. 1B. A portion of the air flow may flow past the one or more fan blades 22 and the one or more outlet guide vanes 24. A portion of the air flow may enter the nacelle 12 through the engine inlet 14 to be mixed with a fuel flow for combustion. As mentioned, the one or more outlet guide vanes 24 may be movable with respect to the nacelle 12 to guide the air flow in a particular direction. Each of the one or more outlet guide vanes 24 may be movable to adjust the lean angle, pitch, sweep, or any combination thereof, of a respective one or more outlet guide vanes 24.

Figure 2:
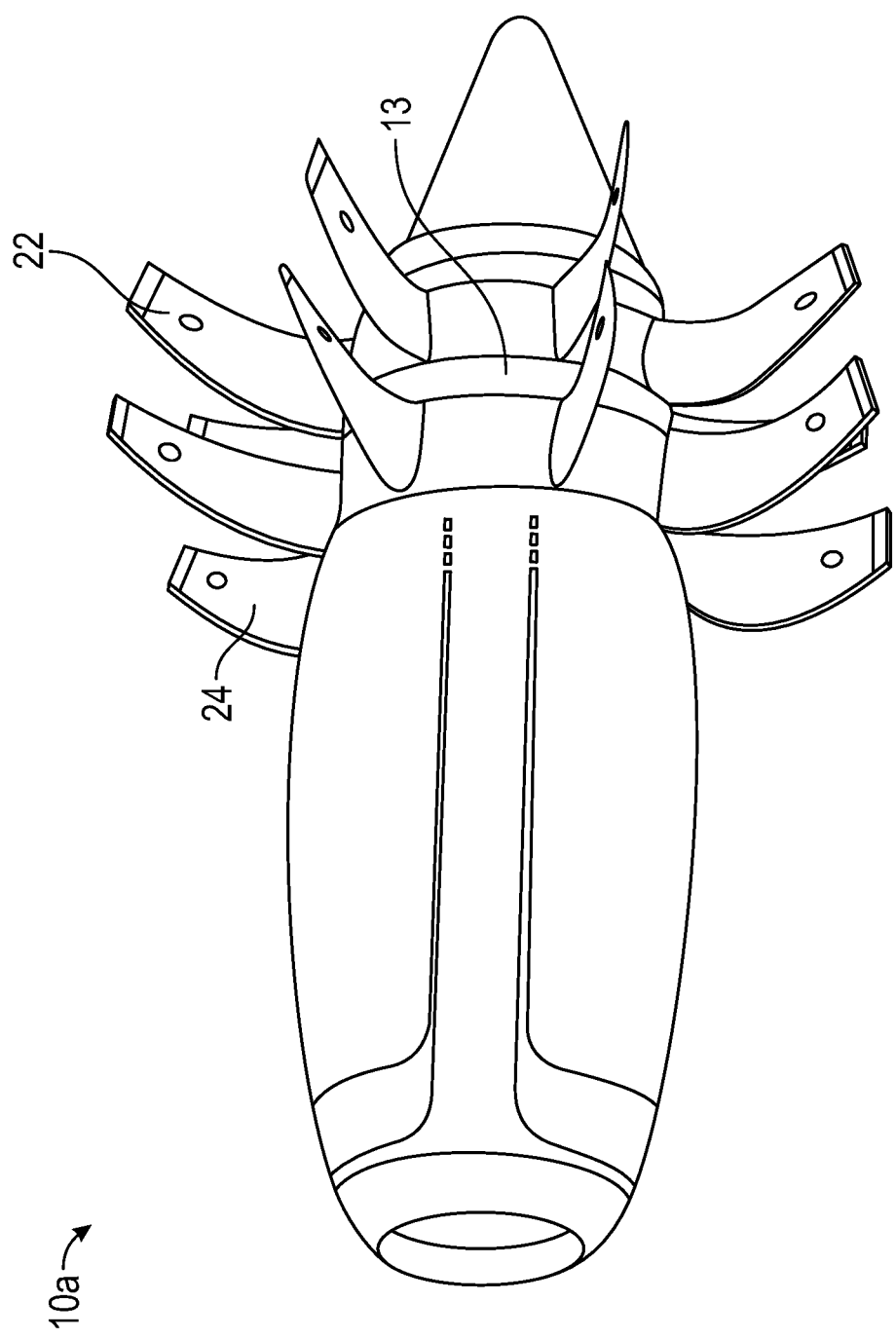
FIG. 2 shows a schematic, perspective view of an unducted single fan engine, according to an embodiment of the present disclosure.

FIG. 2 shows a schematic view of an engine 10a, such as, for example, an unducted single fan (USF) engine 10a. The engine 10a may include all of the features of FIGS. 1A and 1B. However, in FIG. 2, the one or more fan blades 22 and the one or more outlet guide vanes 24 may be located on an aft end or rear portion of the housing 13. For example, the one or more fan blades 22 and the one or more outlet guide vanes 24 may be coupled to a rear portion of the housing 13. The engine 10a of FIG. 2 may have similar components and operation of the engine 10 of FIGS. 1A, 1B, and 3. Furthermore, the one or more outlet guide vanes 24 may either by stationary, as described above, or the one or more outlet guide vanes 24 may rotate counter to the one or more fan blades 22 such that the one or more outlet guide vanes 24 are contra-rotating rotors in a contra-rotating open rotor (CROR) engine.

Figure 3:
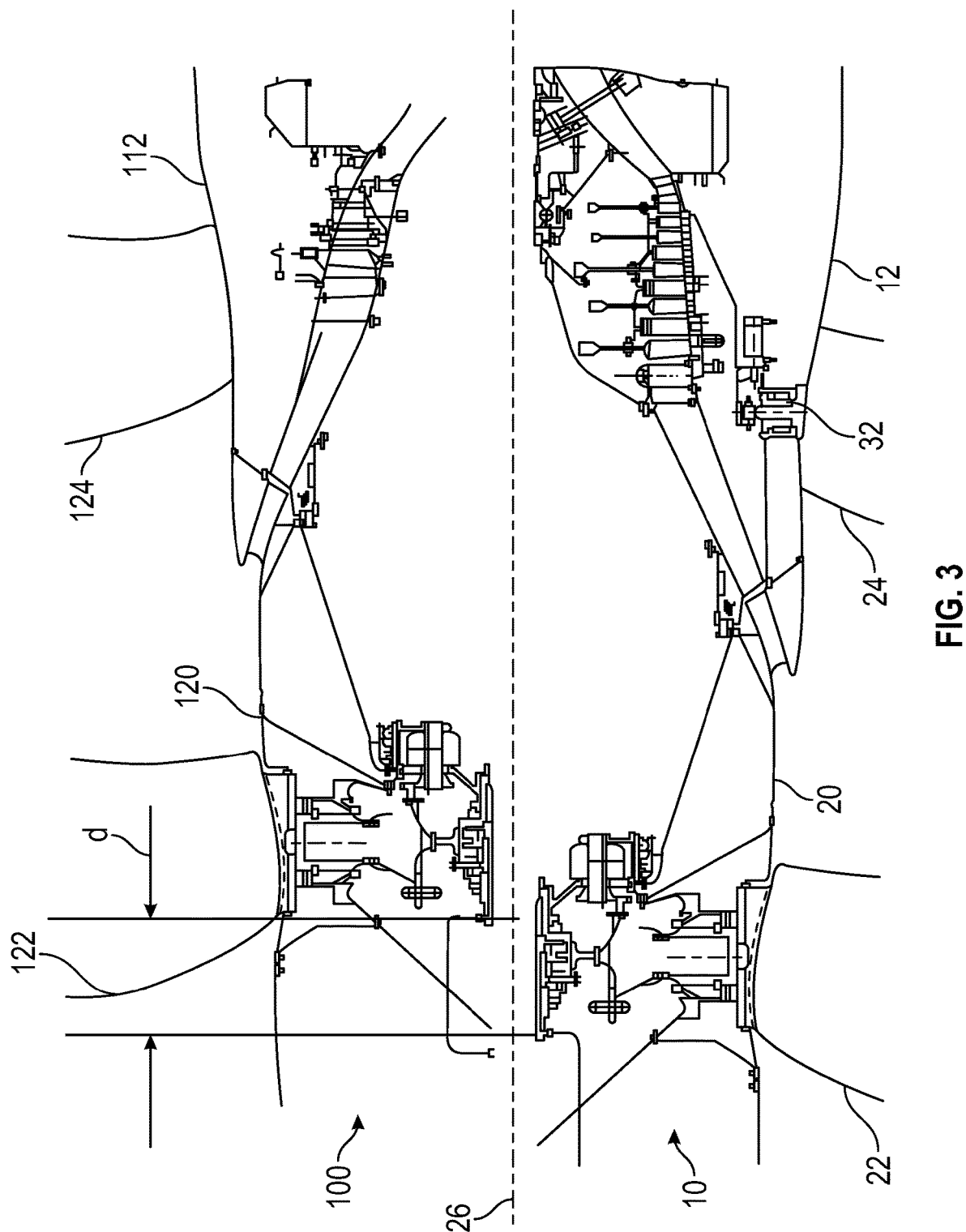
FIG. 3 shows a schematic, partial cross-sectional view taken along a centerline A-A in FIG. 1A, of the unducted single fan engine of FIG. 1A, according to an embodiment of the present disclosure.

With reference to FIG. 3, a partial cross-sectional view of the engine taken along the centerline A-A of FIG. 1A is shown. The partial cross-sectional view of the engine shown in FIG. 3 shows a first engine 100 above the engine centerline 26 and a second engine 10 below the engine centerline 26. A single engine may not include both the first engine 100 and the second engine 10. Rather the engines are shown in the same illustration to facilitate understanding of each engine.

The second engine 10 may include a spinner having a fan hub 20 and a nacelle 12. The fan hub 20 and the nacelle 12 may be the same as, or similar to, the fan hub 20 and the nacelle 12 of FIGS. 1A and 1B. Coupled to the fan hub 20 may be one or more fan blades 22, of which only one is shown. The one or more fan blades 22 may be the same as, or similar to, the one or more fan blades 22 of FIGS. 1A and 1B. Coupled to the nacelle 12 may be one or more outlet guide vanes 24, of which only one is shown. The one or more outlet guide vanes 24 may be the same as, or similar to, the one or more outlet guide vanes 24 of FIGS. 1A and 1B. The second engine 10 may further include an outlet guide vane control device 32. The outlet guide vane control device 32 may allow for control of the relative positioning and/or orientation of the one or more outlet guide vanes 24 with respect to the nacelle 12. For example, the one or more outlet guide vanes 24 may have pitch change axis and/or pitch setting that may be controlled by the outlet guide vane control device 32.

The first engine 100 may include a spinner having a fan hub 120 and a nacelle 112. The fan hub 120 and the nacelle 112 may be the same as, or similar to, the fan hub 20 and nacelle 12 of FIGS. 1A and 1B. Coupled to the fan hub 120 may be one or more fan blades 122, of which only one is shown. The one or more fan blades 122 may be the same as, or similar to, the one or more fan blades 22. Coupled to the nacelle 112 may be one or more outlet guide vanes 124, of which only one is shown. The one or more outlet guide vanes 124 may be the same as, or similar to, the one or more outlet guide vanes 24. In the first engine 100, the outlet guide vane control device 32 may be omitted. In instances when the outlet guide vane control device 32 is omitted, other control devices provide relative positioning, orientation or otherwise shaping of the one or more outlet guide vanes 124 with respect to the nacelle 112 may be provided, as will be discussed in more detail to follow. When the outlet guide vane control device 32 is omitted, the removal of the components of the outlet guide vane control device 32 may allow for additional space for packing and/or a reduction in an overall length L (FIG. 1B) of the engine (e.g., through reduction in length or distance d of the nacelle 112), thereby improving overall fuel efficiency of the aircraft propulsion system.

Figure 4A:
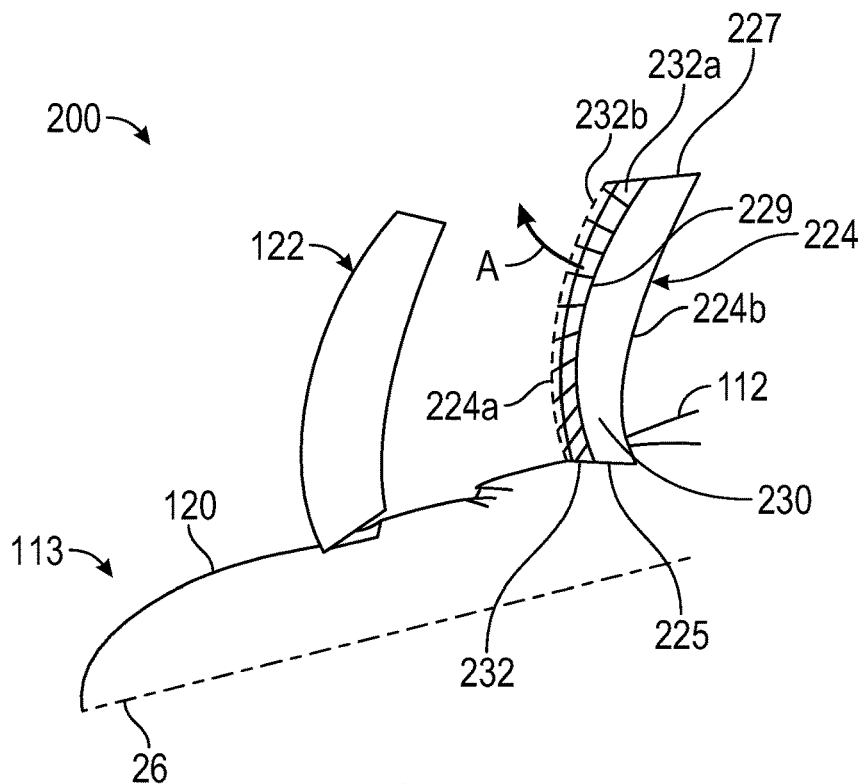
FIG. 4A shows a schematic, partial perspective view of an unducted single fan engine, according to an embodiment of the present disclosure.
Figure 4B:
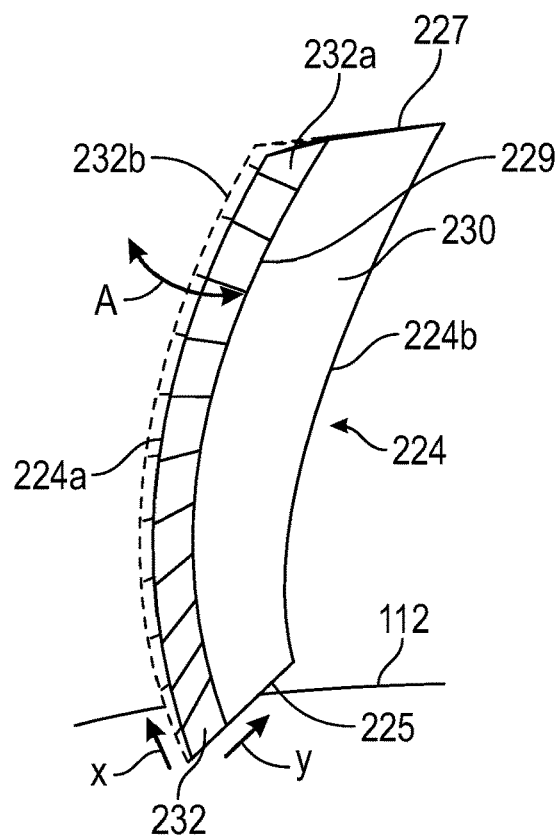
FIG. 4B shows a schematic, perspective view of an outlet guide vane on the unducted single fan engine of FIG. 4A, according to an embodiment of the present disclosure.

FIGS. 4A and 4B show an exemplary outlet guide vane 224 on an engine 200, generally similar to engine 100 of FIG. 3. The outlet guide vane 224 may be an outlet guide vane that allows for the omission of the outlet guide vane control device 32 of FIG. 3. The engine 200 of FIGS. 4A and 4B may be the same or similar as any of the engines described herein. The engine 200 may include a housing 113. The housing 113 may include a fan hub 120 and a nacelle 112. The fan hub 120 may couple the one or more fan blades 122 to the spinner. Although FIGS. 4A and 4B show only a portion of the fan hub 120 and the nacelle 112 and only one fan blade 122 and one outlet guide vane 224, the engine 200, and related components, may be extended circumferentially around the engine centerline 26, such as is shown in FIG. 1A.

With continued reference to FIGS. 4A and 4B, the one or more outlet guide vanes 224 may be the outlet guide vane 124 of FIG. 3. Each of the one or more outlet guide vanes 224 may include a leading edge 224a and a trailing edge 224b. The outlet guide vane 224 may include a body having a first portion 230 and a second portion 232. The first portion 230 may be a main portion 230 and the second portion 232 may be a leading edge portion 232. The leading edge portion 232 may be separated from a full span of the main portion 230. The leading edge portion 232 may move relative to the main portion 230 along a movement axis 229. The leading edge 224a may be defined on the leading edge portion 232. The leading edge 224a may define an edge of the outlet guide vane 224 that the airflow meets or approaches first, prior to passing over the surface of the outlet guide vane 224 (e.g., the main portion 230 and the leading edge portion 232) and leaves the outlet guide vane 224 at the trailing edge 224b. The trailing edge 224b may be defined on the main portion 230. The outlet guide vane 224 may extend from a top surface 227 to a bottom surface 225.

During operation, the leading edge portion 232 may locally move and/or rotate in the direction of arrows A. The leading edge portion 232 may be movable and/or rotatable between a first position 232a and a second position 232b, illustrated by a dotted line. The leading edge portion 232 may be movable to any incremental position between the first position 232a and the second position 232b. The leading edge portion 232 may be actuated to move in the direction of arrows A by an actuation device, not visible in FIGS. 4A and 4B, as will be described in more detail to follow. The leading edge portion 232 may be movable in the direction A+/−25 degrees from an initial position. Thus, the pitch of the leading edge portion 232 may be controlled in the outlet guide vane 224.

Referring still to FIGS. 4A and 4B, the second portion 232 may extend a predetermined distance from the leading edge 224a toward the trailing edge 224b in a direction y (FIG. 4B). The distance between the leading edge 224a and the trailing edge 224b may define the chord of the outlet guide vane 224. The second portion 232 may define a variable leading edge 224a extending from between 5% and 50% of the length of the chord. In some examples, the second portion 232 may define a variable leading edge 224a extending from between 5% and 70% of the length of the chord. The second portion 232 may extend a predetermined distance from the top surface 227 toward the bottom surface 225 in a direction x (FIG. 4B). The second portion 232 may extend the entire, or complete, distance from the top surface 227 to the bottom surface 225, as shown in FIG. 4B. Alternatively, the second portion 232 may extend only a portion of the distance in the x direction from either or both of the top surface 227 and the bottom surface 225. The distance between the top surface 227 and the bottom surface 225 may define the span of the outlet guide vane 224. The second portion 232 may extend a portion of or all of the span length and a portion of the chord length of the outlet guide vane 224.

Figure 5A:
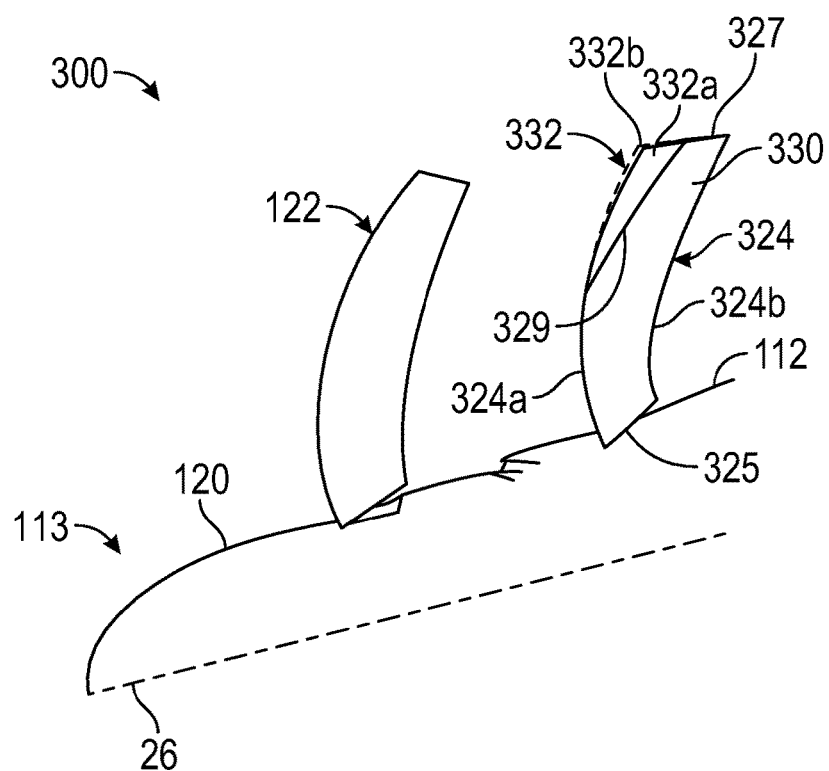
FIG. 5A shows a schematic, partial perspective view of an unducted single fan engine, according to an embodiment of the present disclosure.
Figure 5B:
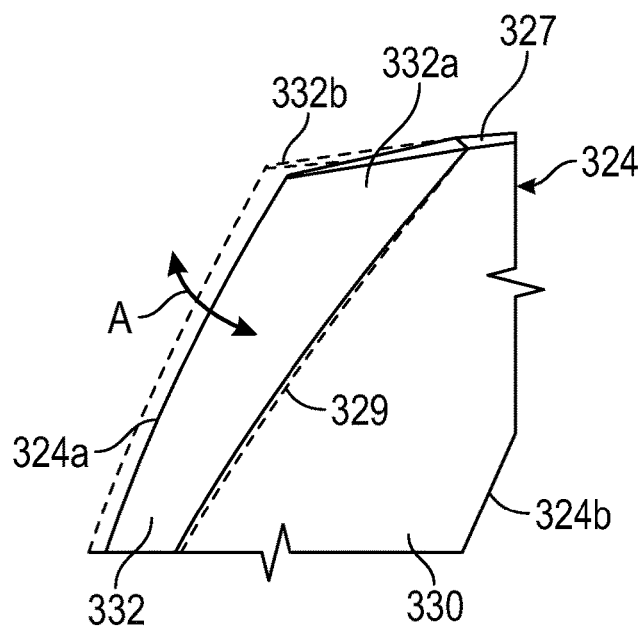
FIG. 5B shows a schematic, partial perspective view of an outlet guide vane on the unducted single fan engine of FIG. 5A, according to an embodiment of the present disclosure.

FIGS. 5A and 5B show an exemplary outlet guide vane 324 on an engine 300 generally similar to engine 100 of FIG. 3. The outlet guide vane 324 may be an outlet guide vane that allows for the omission of the outlet guide vane control device 32 of FIG. 3. The engine 300 of FIGS. 5A and 5B may be the same as, or similar as, any of the engines described herein. The engine 300 may include a housing 113. The housing 113 may include a fan hub 120 and a nacelle 112. The fan hub 120 may couple the one or more fan blades 122 to the spinner 18 (FIG. 1A). Although only a portion of the fan hub 120 and the nacelle 112 and only one fan blade 122 and one outlet guide vane 224 are shown, the engine 100, and related components, may be extended circumferentially around the engine centerline 26, such as shown with respect to FIG. 1A.

With continued reference to FIGS. 5A and 5B, each of the one or more outlet guide vanes 324 may include a leading edge 324a and a trailing edge 324b. Each of the one or more outlet guide vanes 324 may include a body having a first portion 330 and a second portion 332. The first portion 330 may be a main portion 330 and the second portion 332 may be a leading edge portion 332. The leading edge portion 332 may be separated from a partial span of the main portion 330. The leading edge portion 332 may move relative to the main portion 330 along a movement axis 329. The leading edge 324a may be defined on the leading edge portion 332 and the main portion 330. The leading edge 324a may define an edge of the outlet guide vane 324 that the airflow meets or approaches first, prior to passing over the surface of the outlet guide vane 324 (e.g., the main portion 330 and the leading edge portion 332) and leaves the outlet guide vane 324 at the trailing edge 324b. The trailing edge 324b may be defined on the main portion 330. The outlet guide vane 324 may extend from a top surface 327 to a bottom surface 325.

During operation, the leading edge portion 332 may move in the direction of arrows A. The leading edge portion 332 may be movable between a first position 332a and a second position 332b. The leading edge portion 332 may be movable to any incremental position between the first position 332a and the second position 332b. The leading edge portion 332 may be actuated to move in the direction of arrows A by an actuation device, not visible in FIGS. 5A and 5B, as will be described in more detail to follow. The leading edge portion 332 may be movable in the direction A+/−25 degrees from an initial position. Thus, the pitch of the leading edge portion 332 may be controlled in the outlet guide vane 324.

Figure 5C:
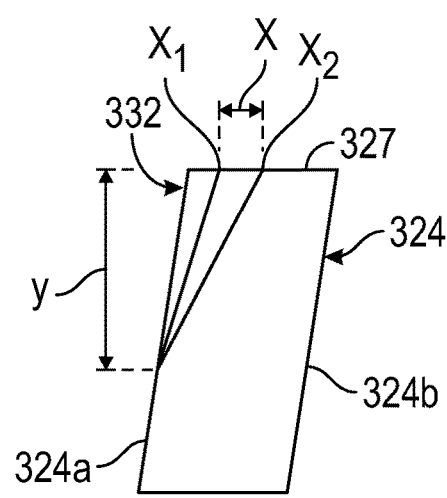
FIG. 5C shows a schematic view of an outlet guide vane on the unducted single fan engine of FIG. 5A, according to an embodiment of the present disclosure.

FIG. 5C shows a schematic diagram of the outlet guide vane 324. The second portion 332 may extend a predetermined distance from the leading edge 324a toward the trailing edge 324b in the direction x. For example, the second portion 332 may extend along the chord length of the outlet guide vane 324 from the leading edge 324a to the point $x_1$ or to the point $x_2$, or to any point along the chord of the outlet guide vane 324. The second portion 332 may define a variable leading edge 324a extending from between 5% and 50% of the chord length. In some examples, the second portion 332 may define a variable leading edge 324a extending from between 5% and 70% of the chord length. The second portion 332 may extend a predetermined distance from the top surface 327 toward the bottom surface 325 (FIG. 5B) in the direction y. Thus, the second portion 332 may extend a portion of the span length (e.g., a distance along direction y) and a portion of the chord length (e.g., a distance along direction x) of the outlet guide vane 324.

During operation of engines shown in FIGS. 1 to 5C, with engine 10 referred to in this paragraph for simplicity, air flows from the forward end of the engine 10 (near spinner 18) toward the rear of the engine (near engine outlet 16) (FIGS. 1A and 1B). The air flow may generate acoustic noise due to the interaction of the air flow past the one or more fan blades (rotating about the engine centerline 26) and the one or more outlet guide vanes (stationary with respect to rotation about the engine centerline 26). To reduce this noise, each of the one or more outlet guide vanes is configured to move with respect to the nacelle. This movement may be accomplished by one or more of the actuation devices described herein.

During the course of the flight, different operating conditions of the engine result in different noise conditions. Thus, each stage of flight may result in a separate state or position of the one or more outlet guide vanes. For example, during cruise versus during takeoff, one or more of the one or more outlet guide vanes may be at a different angle not only to achieve different engine performance and air flow, but to alleviate the acoustic noise generated at each stage of flight. Thus, each of the one or more outlet guide vanes may be separately and independently controlled with respect to the remaining outlet guide vanes. That is, each of the one or more outlet guide vanes may be controlled to be at an angle independent of the remaining one or more outlet guide vanes. In some examples, the one or more outlet guide vanes may be controlled simultaneously to perform the same or different movements. In some examples, one or more, or all, of the outlet guide vanes may be controlled.

FIGS. 6, 7, 8, 9A, 9B, 10A, and 10B show exemplary actuation devices. The actuation devices may allow for relative movement of a leading edge portion (e.g., leading edge portion 232 or leading edge portion 332) with respect to the main portion (e.g., main portion 230 or main portion 330). Exemplary actuation devices for providing variable pitch, lean angle, sweep, and camber/twist of the one or more outlet guide vanes may include shape memory alloys, mechanical actuation, electrical actuation, bi-metallic actuation, or any combination thereof.

Figure 6:
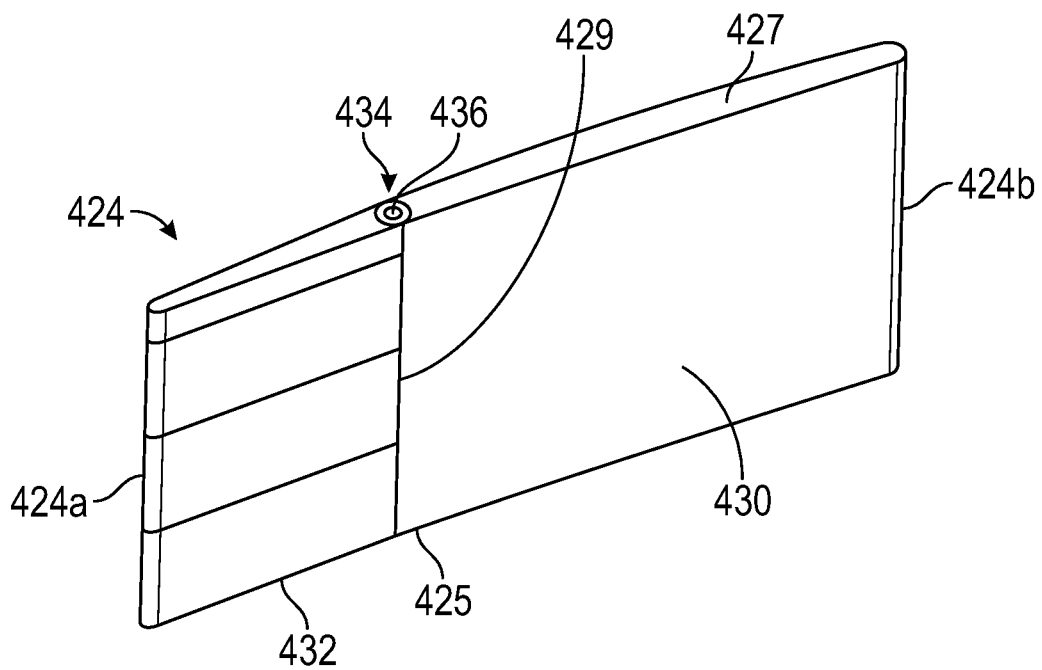
FIG. 6 shows a schematic, partial perspective view of an outlet guide vane for an unducted single fan engine, according to an embodiment of the present disclosure.

FIG. 6 shows an exemplary outlet guide vane 424. The outlet guide vane 424 may be the same as, or similar to, the outlet guide vane 224 and/or the outlet guide vane 324. The outlet guide vane 424 may include a leading edge portion 432 and a main portion 430. The outlet guide vane 424 may extend from a leading edge 424a to a trailing edge 424b. The outlet guide vane 424 may extend from a top surface 427 to a bottom surface 425. As discussed with respect to outlet guide vanes 224, 324, the leading edge portion 432 may move relative to the main portion 430 along a movement axis 429.

With continued reference to FIG. 6, the outlet guide vane 424 may include an actuation device 434. The actuation device 434 may comprise a mechanical actuation device. For example, the actuation device 434 may comprise a hinge. For example, the actuation device 434 may include a pin 436 coupled between the main portion 430 and the leading edge portion 432. The pin 436 may function as a pivot axis for the leading edge portion 432. Thus, the leading edge portion 432 may be capable of rotating, pivoting, or otherwise moving in the direction A (e.g., FIGS. 4B and 5B) with respect to the main portion 430.

Figure 7:
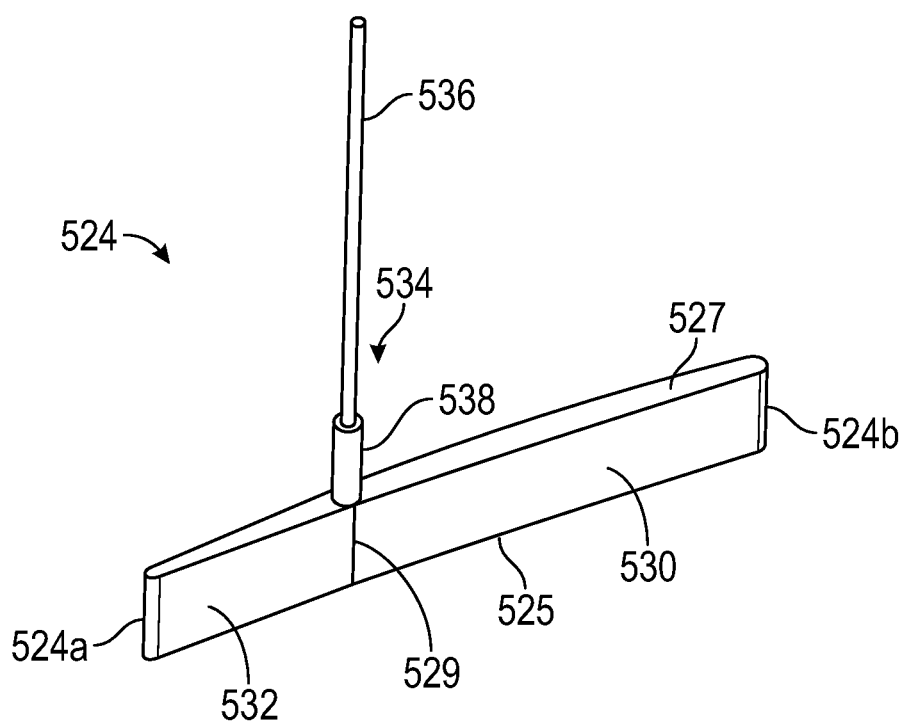
FIG. 7 shows a schematic, partial perspective view of an outlet guide vane for an unducted single fan engine, according to an embodiment of the present disclosure.

FIG. 7 shows an exemplary outlet guide vane 524. The outlet guide vane 524 may be the same as, or similar to, the outlet guide vane 224 and/or the outlet guide vane 324. The outlet guide vane 524 may include a leading edge portion 532 and a main portion 530. The outlet guide vane 524 may extend from a leading edge 524a to a trailing edge 524b. The outlet guide vane 524 may extend from a top surface 527 to a bottom surface 525. As discussed with respect to outlet guide vanes 224, 324, the leading edge portion 532 may move relative to the main portion 530 along a rotation axis 529.

With continued reference to FIG. 7, the outlet guide vane 524 may include an actuation device 534. The actuation device 534 may comprise an electrical actuator. For example, the actuation device 534 may include a motor 538 and an electrical cable 536. When a voltage is applied to the motor 538, the motor 538 may be capable of rotating, pivoting, or otherwise moving the leading edge portion 532 in the direction A (e.g., FIGS. 4B and 5B) with respect to the main portion 430.

Figure 8:
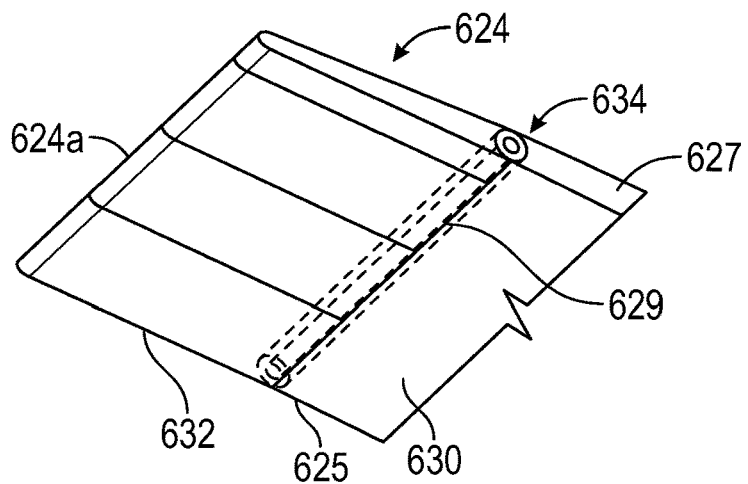
FIG. 8 shows a schematic, partial perspective view of an outlet guide vane for an unducted single fan engine, according to an embodiment of the present disclosure.

FIG. 8 shows an exemplary portion of an outlet guide vane 624. The outlet guide vane 624 may be the same as, or similar to, the outlet guide vane 224 and/or the outlet guide vane 324. The outlet guide vane 624 may include a leading edge portion 632 and a main portion 630. The outlet guide vane 624 may extend from a leading edge 624a to a trailing edge (not shown). The outlet guide vane 624 may extend from a top surface 627 to a bottom surface 625. As discussed with respect to outlet guide vanes 224, 324, the leading edge portion 632 may move relative to the main portion 630 along a movement axis 629. The outlet guide vane 624 may include an actuation device 634. The actuation device 634 may be a torque tube configured to translate rotation to the leading edge portion 632 such that the leading edge portion 632 rotates, pivots, or otherwise moves with respect to the main portion 430 in the direction A (e.g., as shown in FIGS. 4B and 5B).

Figure 9A:
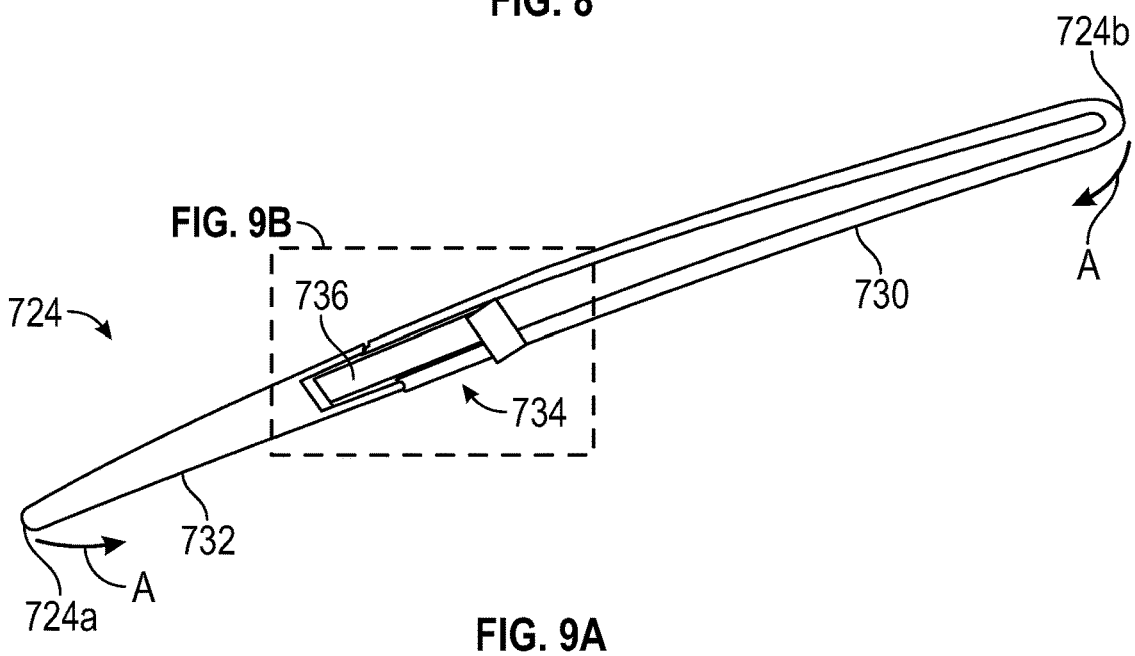
FIG. 9A shows a schematic, partial perspective view of an outlet guide vane for an unducted single fan engine, according to an embodiment of the present disclosure.
Figure 9B:
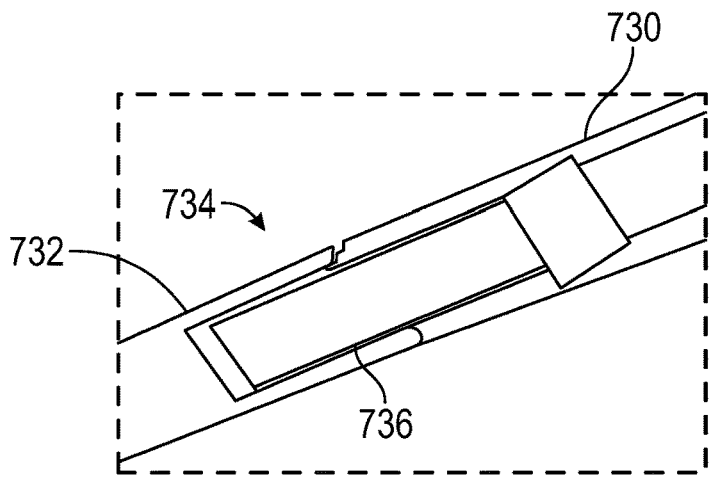
FIG. 9B shows an enlarged schematic view of a portion of the outlet guide vane of FIG. 9A, according to an embodiment of the present disclosure.

FIGS. 9A and 9B show an exemplary outlet guide vane 724. The outlet guide vane 724 may at be the same as, or similar to, the outlet guide vane 224 and/or the outlet guide vane 324. The outlet guide vane 724 may include a leading edge portion 732 and a main portion 730. The outlet guide vane 724 may extend from a leading edge 724a to a trailing edge 724b. As discussed with respect to outlet guide vanes 224, 324, the leading edge portion 732 may move relative to the main portion 730 along a movement axis.

With continued reference to FIGS. 9A and 9B, the outlet guide vane 724 may include an actuation device 734. The actuation device 734 may comprise a high conductivity metal 736. The high conductivity metal 736 may be bi-metallic metal through which temperature changes the state of the metal. For example, the actuation device 734 may comprise two strips of high conductivity metal 736 that expand at different rates. The high conductivity metal 736 may be heated to result in deflection of the leading edge 724a to alter the camber of the leading edge 724a. In some examples, the actuation device 734 may include separate bimetallic arrangements to change both leading edge camber and trailing edge camber individually. The leading edge 724a and the trailing edge 724b may be deflected in the direction of arrows A. In the embodiment of FIGS. 9A and 9B, the leading edge portion 732 may be formed of titanium and the main portion 730 may be formed of a composite. More cooling may move the leading edge 724a and the trailing edge 724b toward each other. Lesser cooling (i.e., reduced heating) may move the outlet guide vane 724 to an interim position.

Referring now to FIGS. 10A and 10B, another exemplary actuation device may comprise a shape memory alloy. The shape memory alloy may have a first state 800a at a low temperature (FIG. 10A) and a second state 800b at a high temperature (FIG. 10B), the temperature of the actuation device shown in FIG. 10A being low as compared to the temperature of the actuation device shown in FIG. 10B and vice versa. In FIG. 10A, an exemplary piece of shape memory alloy 806 in the first state 800a may include a first end 802 and a second end 804, each at a first position. As the piece of shape memory alloy 806 is heated from the low temperature of FIG. 10A to the high temperature of FIG. 10B, the ends 802 and 804 may move in the direction B toward each other. This movement may result in the second state 800b at the high temperature. The piece of shape memory alloy 806 may also be cooled from the high temperature of FIG. 10B to the lower temperature of FIG. 10A. When cooled, the ends 802 and 804 move away from each other in a direction opposite to the direction B. Thus, the shape memory alloy may allow for repeated movement between the first state 800a and the second state 800b. In embodiments of the present disclosure, a shape memory alloy may be included within the outlet guide vane to allow for controlling the camber of the outlet guide vane, as will be described in more detail to follow.

Figure 11A:
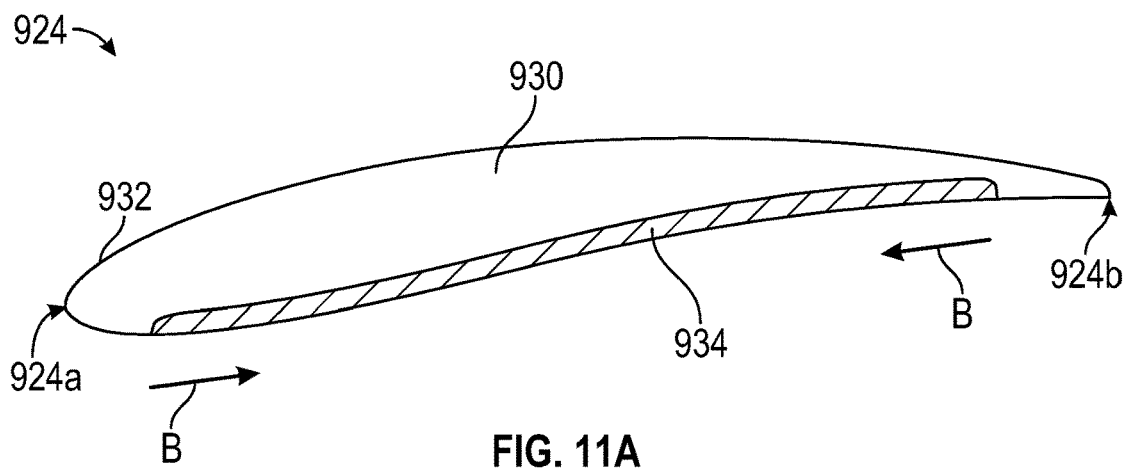
FIG. 11A shows an elevational view of a schematic outlet guide vane, in a first state, according to an embodiment of the present disclosure.
Figure 11B:
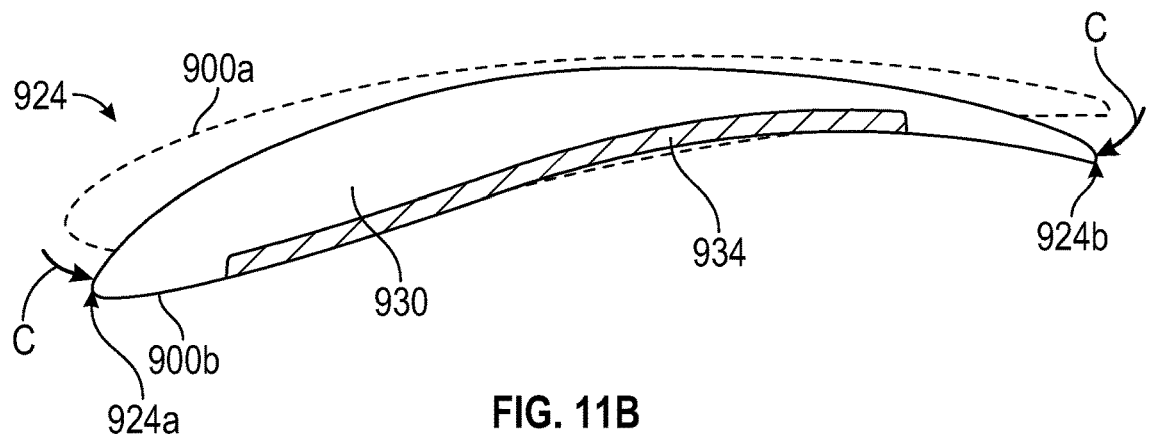
FIG. 11B shows an elevational view of a schematic outlet guide vane, in a second state, according to an embodiment of the present disclosure.
Figure 11C:
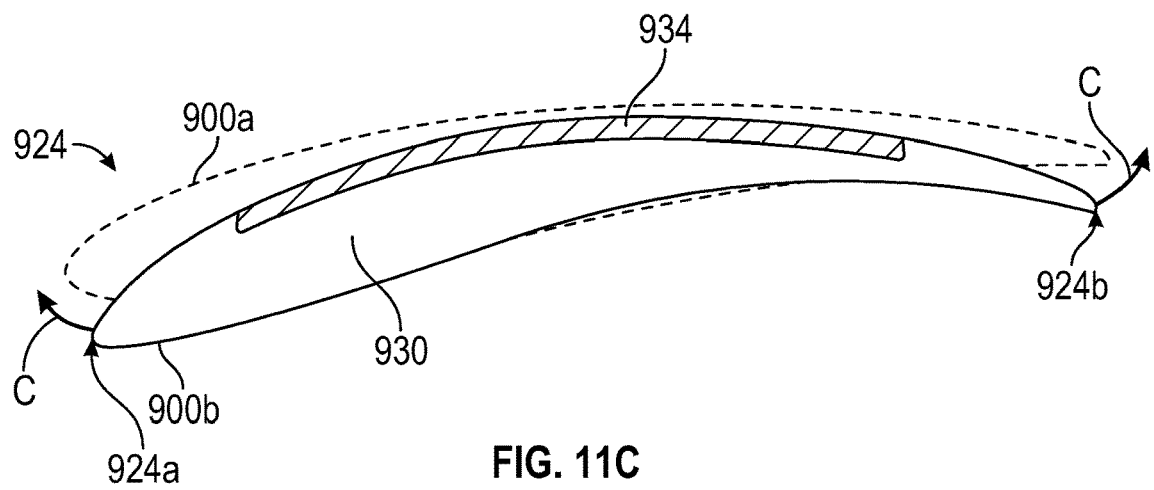
FIG. 11C shows an elevational view of a schematic outlet guide vane, in a second state, according to an embodiment of the present disclosure.

One exemplary implementation of a shape memory alloy as the actuation device is shown in FIGS. 11A to 11C. The outlet guide vane 924 may include a leading edge portion 932 having a leading edge 924a and a main portion 930 having a trailing edge 924b. The outlet guide vane 924 may include an actuation device 934. The actuation device 934 may be embedded within the outlet guide vane 924. Although visible in FIG. 11A, the actuation device 934 may be embedded such that it is not visible from a surface view of the outlet guide vane 924. The actuation device 934 may be a shape memory alloy. That is, a shape memory alloy may be embedded within the outlet guide vane 924.

With continued reference to FIGS. 11A to 11C, in operation, the actuation device 934 may be heated to move the leading edge 924a and the trailing edge 924b toward each other in the direction B. The heating of the actuation device 934, and thus the heating of the shape memory alloy, may be passive or may be active. That is, for example, the heating may occur at ambient temperatures (e.g., passive heating) or may be electrically provided (e.g., active heating). Accordingly, when heated, the outlet guide vane 924 may move from a first state 900a of FIG. 11B to a second state 900b of FIG. 11B. This may increase the camber of the outlet guide vane 924. Lesser heating may move the outlet guide vane 924 to an interim position between the first state 900a and the second state 900b. When the actuation device 934 is provided along the suction side surface as shown in FIG. 11C, when heated, the outlet guide vane 924 may move from the first state 900a of FIG. 11C to the second state 900b of FIG. 11C. This may decrease the camber of the outlet guide vane 924. As shown in FIG. 11B, the leading edge 924a and the trailing edge 924b may move in the direction C toward a center of the outlet guide vane 924 and thereby increase airfoil camber.

The actuation device 934 may be cooled to move the leading edge 924a and the trailing edge 924b away from each other in a direction opposite of the direction B. The cooling of the actuation device 934, and thus the cooling of the shape memory alloy, may be passive or may be active. That is, for example, cooling may occur at ambient temperatures (e.g., passive cooling) or may be electrically provided (e.g., active cooling). The ambient temperature may be a temperature at altitude (e.g., during cruise) and/or may be a temperature closer to ground level (e.g., during takeoff and landing). Accordingly, when cooled, the outlet guide vane 924 may move from the second state 900b to the first state 900a. Although shown along the forward surface of the outlet guide vane 924 in FIG. 11A, the actuation device 934 (and thus the shape memory alloy) may be positioned along the back surface, within a middle portion of the outlet guide vane 924, along the forward surface, or any combination thereof.

Figure 12B:
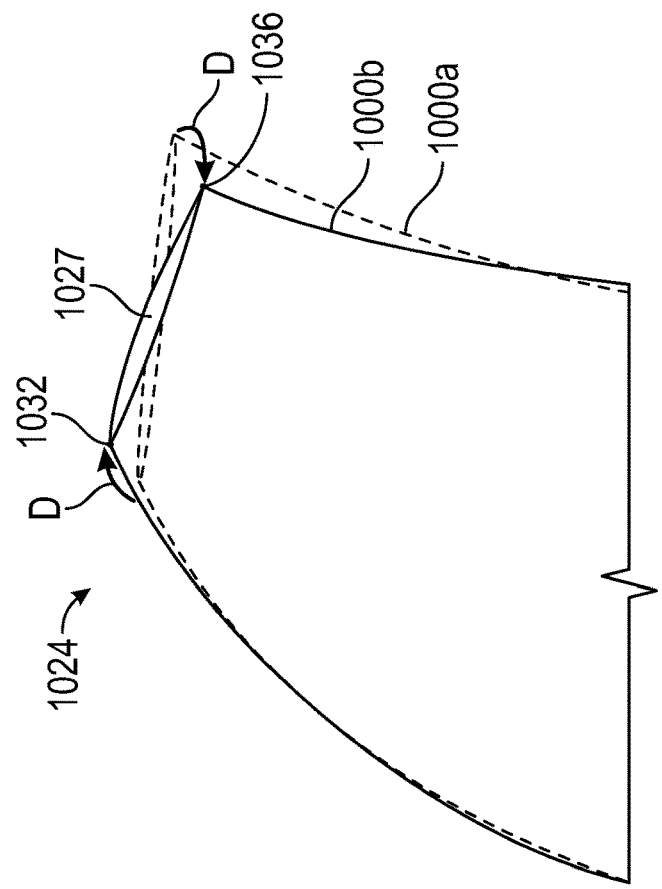
FIG. 12B shows a schematic partial perspective view of an outlet guide vane, in a second state, according to an embodiment of the present disclosure.
Figure 12A:
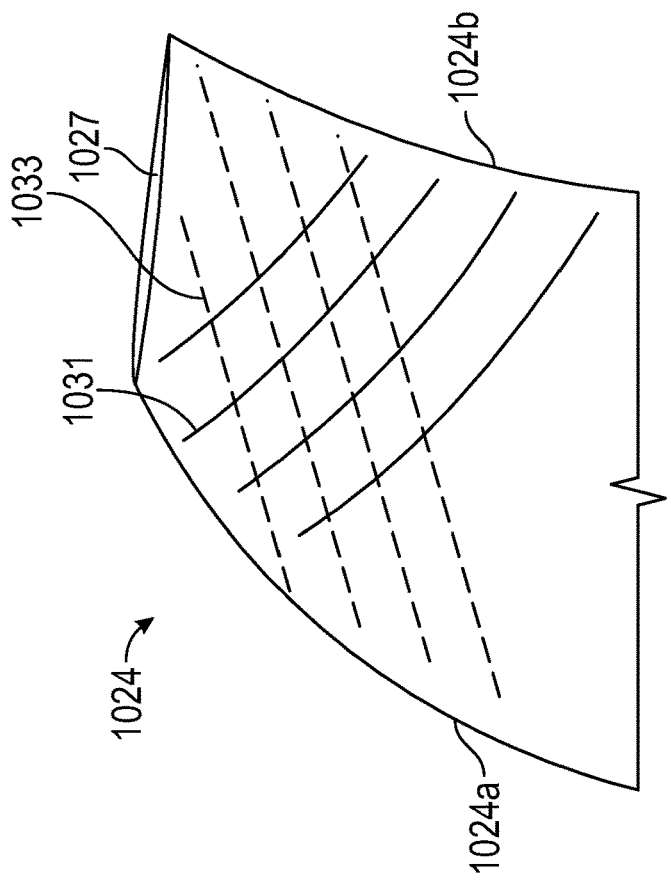
FIG. 12A shows a schematic partial perspective view of an outlet guide vane, in a first state, according to an embodiment of the present disclosure.

Another exemplary implementation of a shape memory alloy as the actuation device is shown in FIGS. 12A and 12B. An outlet guide vane 1024 may include a leading edge 1024a and a trailing edge 1024b. The outlet guide vane 1024 may include an actuation device that may include one or both of an actuation device 1031 and an actuation device 1033. Although visible in FIG. 12A, the actuation device 1031 and/or the actuation device 1033 may be embedded so as not to be visible from a surface view of the outlet guide vane 1024. The actuation device 1031, 1033 may be a shape memory alloy. That is, a shape memory alloy may be embedded within the outlet guide vane 1024. The actuation device 1031 may be embedded arbitrarily in a three-dimensional orientation extending from the leading edge toward the trailing edge in a direction from an upper surface 1027 toward a root section (not shown) arranged so as to effect an intended three-dimensional displacement of the vane structure. The actuation device 1033 may be embedded in an orientation extending from the trailing edge toward the leading edge in a direction from the upper surface 1027 toward the lower surface (not shown).

In operation, the actuation device 1031, 1033 may be separately actuated to control movement of the leading edge 1024a and the trailing edge 1024b at the upper surface 1027. As shown in FIG. 12B, when the shape memory alloys are activated (e.g., heated and/or cooled), the point 1032 on the leading edge 1024a of the upper surface 1027 and the point 1036 on the trailing edge 1024b of the upper surface 1027 may move in a direction D. In this manner, the outlet guide vane 1024 may move from a first state 1000a to a second state 1000b. Although shown near the upper surface 1027, the actuation devices 1031 and 1033 (and thus the shape memory alloy) may be positioned near the bottom surface (not shown). The shape memory alloys of the actuation device 1031 and 1033 may be the same or different and may have the same properties or different properties such that movement of the points 1032 and 1036 occur in similar or dissimilar fashion. This may result in tip twist or tip camber of the outlet guide vane 1024.

Figure 13:
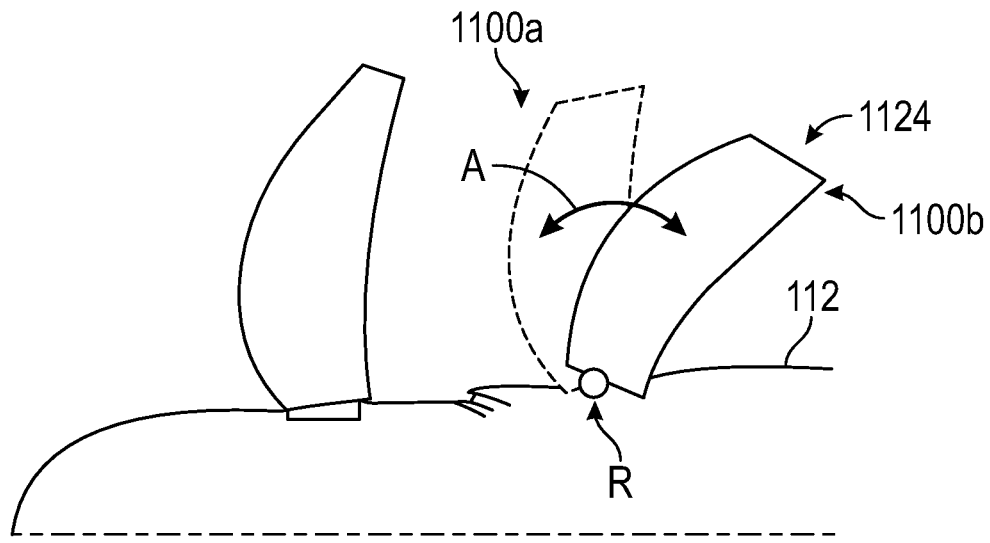
FIG. 13 shows a schematic partial perspective view of an unducted single fan engine, according to an embodiment of the present disclosure.
Figure 14:
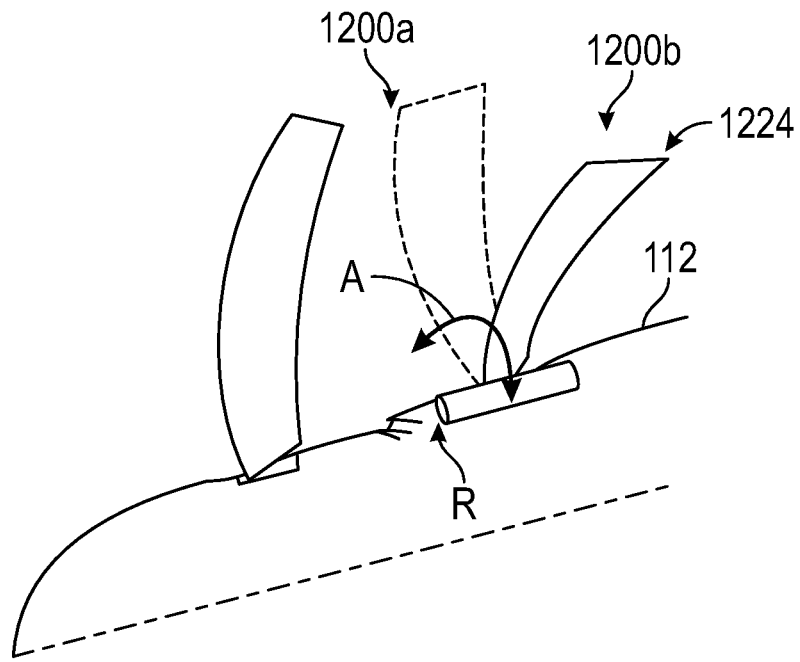
FIG. 14 shows a schematic partial perspective view of an unducted single fan engine, according to an embodiment of the present disclosure.
Figure 15:
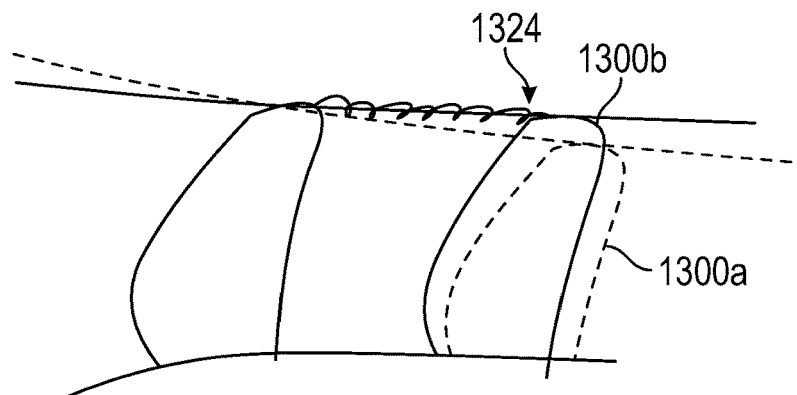
FIG. 15 shows a schematic partial side view of an unducted single fan engine, according to an embodiment of the present disclosure.
Figure 16A:
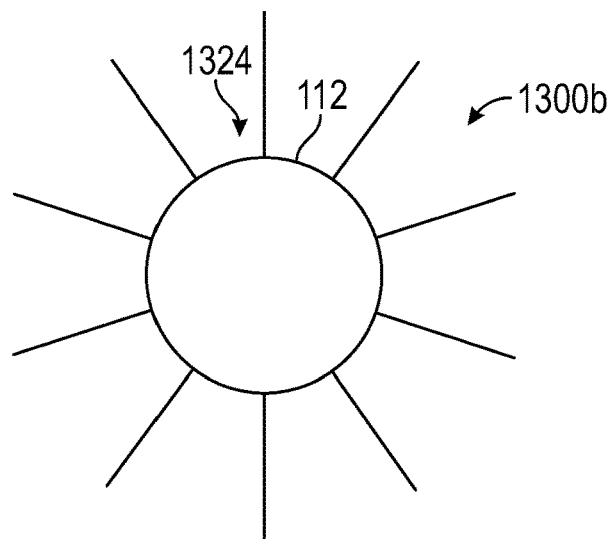
FIG. 16A shows a schematic view of outlet guide vanes of the unducted single fan engine of FIG. 15 in a cruise condition, according to an embodiment of the present disclosure.
Figure 16B:
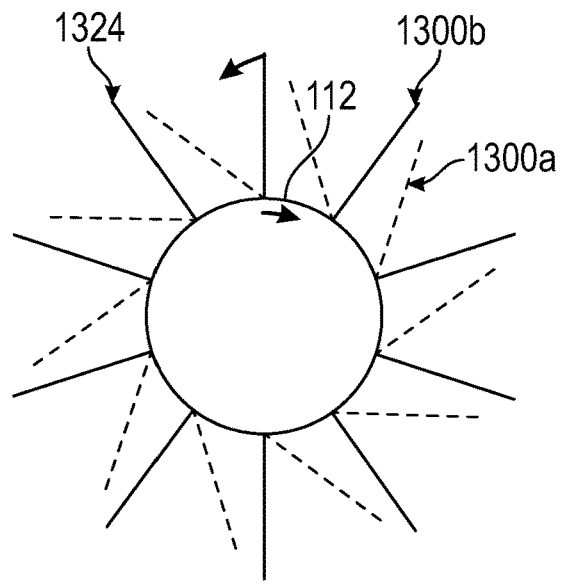
FIG. 16B shows a schematic view of outlet guide vanes of the unducted single fan engine of FIG. 15 in a takeoff condition, according to an embodiment of the present disclosure.

Referring to FIGS. 13 and 14, the outlet guide vane of the present disclosure may be controlled with respect to the nacelle 112. Referring first to FIG. 13, an outlet guide vane 1124 may be moved from a first position 1100a to a second position 1100b and to any position therebetween. The outlet guide vane 1124 may be moved along the direction A such that the sweep of the outlet guide vane 1124 is varied. The axis of rotation R of the outlet guide vane 1124 may extend in a direction perpendicular to the page. The sweep may be varied between minus 10 degrees to plus forty-five degrees. The first position 1100a may be a cruise position and the second position 1100b may be a takeoff position. The sweep may vary how much the outlet guide vane "stands" or how vertical the outlet guide vane 1124 is presented with respect to the nacelle 112. The sweep may be changed at any time during flight. For example, if a wake hits the outlet guide vane 1124, the outlet guide vane 1124 may be controlled to sweep the blade and cause the radial distance of the tip to the rotation axis to be reduced such that the noise created by the wake and tip vortex associated with the upstream fan blades is reduced or eliminated.

Referring to FIG. 14, an outlet guide vane 1224 may be moved from a first position 1200a to a second position 1200*b* and to any position therebetween. The outlet guide vane 1224 may be moved along the direction A such that the lean angle or dihedral angle setting of the outlet guide vane 1224 is varied. The lean angle may be varied between minus forty-five degrees to plus forty-five degrees. The axis of rotation R of the outlet guide vane 1224 is shown in FIG. 14. The lean angle of the outlet guide vane 1224 may be controlled to reduce acoustic noise.

FIGS. 15 to 18 illustrate views of lean angle control of an outlet guide vane 1324 in an unducted single fan engine. As shown, the lean angle of the outlet guide vane 1324 may vary between a first position 1300*a* and a second position 1300*b*. For example, in the first position 1300*a*, the engine may be in a takeoff condition and in the second position 1300*b*, the engine may be in a cruise condition. The outlet guide vane 1324 may be moved such that the lean angle of the outlet guide vane 1324 is varied. The lean angle at takeoff may be reduced as compared to the lean angle at cruise. FIG. 16A shows a front view of the outlet guide vanes 1324 in the second position 1300*b* at the cruise condition. In FIG. 16A, the lean angle of the outlet guide vanes 1324 may be radial, that is, the outlet guide vanes 1324 extend radially outward from the nacelle 112. This may result in a state of maximum radial height for the outlet guide vane 1324 that allows for full span deswirl. In FIG. 16B, the outlet guide vanes 1324 may be varied such that the lean angle is changed or varied to the first position 1300*a*. In FIG. 16B, the outlet guide vanes 1324 may be actively adjusted in effective height to appear more or less clipped in radial height as appropriate for a given flight condition (longer effective height at cruise, less at takeoff). In this manner, the interaction noise may be reduced at takeoff for example, while the aerodynamic efficiency increased at cruise.

Referring to FIGS. 17 and 18, an actuation device 1334 may move the outlet guide vane 1324 longitudinally or axially along the body of the nacelle 112 (FIG. 17) and/or circumferentially around the outer radial surface of the nacelle 112 (FIG. 18). The actuation device 1334 may allow for the adjustment or variation of the lean angle as described herein. The actuation device 1334 may be a linear actuator, a mechanical actuator, or any actuation device described herein, or combinations thereof.

FIGS. 19 and 20 illustrate views of curvature and/or height control of an outlet guide vane 1424. As shown, the curvature of the outlet guide vane 1424 may vary between a first position 1400*a* and a second position 1400*b*. The variation in the curvature of the outlet guide vane 1424 may control the height of the outlet guide vane 1424 and thus amount of the outlet guide vane 1424 exposed to air flow. For example, in the first position 1400*a*, the engine may be in a takeoff condition and in the second position 1400*b*, the engine may be in a cruise condition. The outlet guide vane 1424 may be moved such that the curvature of the outlet guide vane 1424 is varied. The curvature at takeoff may be increased such that the height is decreased at takeoff as compared to cruise, such as shown in the first position 1400*a*. The curvature at cruise may be decreased such that the height is increased at cruise as compared to takeoff, such as shown in the second position 1400*b*. An actuation device 1434 may cause the variation in the curvature of the outlet guide vane 1424. The actuation device 1434 may be embedded in the outlet guide vane 1424. The actuation device 1434 may be a shape memory alloy, a bi-metallic material strip, a piezoelectric fiber, or combinations thereof. Thus, as discussed previously, the temperature of the outlet guide vane 1424, and thus the actuation device 1434, may be varied to alter the curvature of the outlet guide vane 1424. The actuation device 1434 may bend or curve the proplet 1426 of the outlet guide vane 1424. A shorter height may be present at takeoff for interaction noise.

Although described separately, any of the actuation devices of the present disclosure may be combined with other actuation devices in the same outlet guide vane and/or in the different outlet guide vanes of the same engine. For example, the outlet guide vanes of the present disclosure may be controlled to vary pitch, sweep, and lean angle simultaneously by suitably orienting rotation axis R of the vanes in an appropriate 3D direction. Further, although the separately articulated leading edge features were described with respect to the leading edge, the variable edge may be the trailing edge, the tip edge, or a combination of the leading edge, the trailing edge and the tip edge. Additionally, or alternatively, other actuation devices may be considered, such as, for example, but not limited to mechanical actuation devices, hydraulic actuation devices, electrical actuation devices, mechanical actuation devices that include mechanical stops and/or locks. That is, the actuation device of the present disclosure may be any device that may allow for the movable portion of the outlet guide vane (e.g., the movable leading edge) to be fixed in a particular position based on a particular state of operation of the aircraft and/or engine.

Accordingly, the outlet guide vane of the present disclosure provides a variable leading edge of the outlet guide vane. The variable outlet guide vane may be achieved through tip twist, tip camber, full span movement, or split span movement. Any or all of these may be achieved through the use of a shape memory alloy, bi-metallic actuation, electric actuation, or similar forms of effecting movement of the features described herein.

The ability to control the orientation of the outlet guide vane may reduce noise produced in a USF engine. For example, noise is generated in a USF engine in part due to Fan-OGV interaction noise. The profile of the OGV needs to be designed accordingly to address the noise. This orientation or design, however, differs between cruise and takeoff and landing conditions. At cruise conditions, a concern is engine efficiency and cabin noise. At takeoff conditions, a concern is community noise and thrust. In order to be able to alleviate all concerns and noise created during both takeoff and cruise conditions, the outlet guide vane of the present disclosure is provided with an actuation device to adjust the orientation and position of the outlet guide vane.

Thus, the outlet guide vane of the present disclosure includes a variable tip and leading edge portion that may be deflected at an angle and/or camber or curvature selected for a given condition. The outlet guide vane of the present disclosure is configured to be actively tuned (e.g., actively tuning the effective vane camber/twist, the pitch, the lean angle, etc.) to enable optimal aeroacoustics across the flight, from takeoff to cruise and approach. For example, altering the OGV pitch may reduce overall community noise power. Actively recambering the OGV tip leading edge operates on the same noise source without compromising takeoff thrust and further offering the potential to eliminate the complex OGV pitch control mechanism (e.g., as shown in the lower half of FIG. 2). The removal of the OGV pitch control mechanism may save space to shorten the engine length. However, the OGV pitch control mechanism may be maintained and may work to position the full pitch of the blade with the present disclosure serving to fine tune or to tweak the position of the OGV.

Accordingly, the outlet guide vane of the present disclosure allows for a reduction in noise (as compared to conventional USF engines), minimizes fan blade and OGV interaction noise, reduces the weight and cost of the engine, eliminates the pitch control mechanism, allows for enhanced packaging of the booster, shortens the engine length, and improves engine operation and efficiency. Furthermore, the outlet guide vane of the present disclosure achieves a simplified assembly and maintenance. Although described with respect to a USF engine, the outlet guide vanes and control devices of the present disclosure may be employed in other engines, such as, for example, but not limited to contra-rotating open rotor engines.

Further aspects of the present disclosure are provided by the subject matter of the following clauses.

An unducted single fan engine may include a housing having one or more fan blades coupled to the housing and configured to rotate circumferentially and one or more outlet guide vanes coupled to the housing, each of the one or more outlet guide vanes comprising a leading edge portion having a variable leading edge. The unducted single fan engine may include one or more actuation devices coupled to each of the one or more outlet guide vanes, the one or more actuation devices configured to control the variable leading edge of the respective outlet guide vane. The variable leading edge is controllable to vary a pitch, camber, lean angle, curvature, height, or sweep of the respective outlet guide vane.

The unducted single fan engine of any preceding clause, wherein the housing includes a spinner configured to rotate about a centerline of the unducted single fan engine and a nacelle coupled to the spinner, wherein the one or more fan blades are configured to rotate with the spinner.

The unducted single fan engine of any preceding clause, wherein the one or more actuation devices are within the one or more outlet guide vanes.

The unducted single fan engine of any preceding clause, wherein the variable leading edge and the leading edge portion are movable with respect to a remaining, main portion of the outlet guide vane about a movement axis.

The unducted single fan engine of any preceding clause, wherein the variable leading edge is configured to extend along an entire span of the outlet guide vane.

The unducted single fan engine of any preceding clause, wherein the variable leading edge is configured to extend from 10% to 70% of a span length of the outlet guide vane.

The unducted single fan engine of any preceding clause, wherein the leading edge portion extends along at least a portion of a chord length of the outlet guide vane, along at least a portion of a span length of the outlet guide vane, or along at least a portion of both the chord length and the span length.

The unducted single fan engine of any preceding clause, wherein the leading edge portion extends along an entire chord length of the outlet guide vane and an entire span length of the outlet guide vane.

The unducted single fan engine of any preceding clause, wherein the one or more actuation devices effectuate (i) twisting of the leading edge portion of the outlet guide vane, (ii) proplet curvature control of the leading edge portion of the outlet guide vane, (iii) rotation or hinging of the leading edge portion of the outlet guide vane, (iv) or combinations thereof.

The unducted single fan engine of any preceding clause, wherein the variable leading edge is configured to be moved during operation of the unducted single fan engine, and wherein a position of the variable leading edge is based upon an operating state of the unducted single fan engine.

The unducted single fan engine of any preceding clause, wherein the variable leading edge is a proplet and wherein the one or more actuation devices is configured to control the proplet to vary the curvature and the height of the outlet guide vane.

The unducted single fan engine of any preceding clause, wherein the one or more actuation devices are one or more of a mechanical actuation device, an electrical actuation device, a bi-metallic actuation device, a shape memory alloy, a hinge, a motor, and a torque tube.

The unducted single fan engine of any preceding clause, wherein the one or more actuation devices are configured to vary a position of the variable leading edge with respect to the outlet guide vane.

The unducted single fan engine of any preceding clause, wherein the one or more actuation devices are a shape memory alloy or a bi-metallic material.

The unducted single fan engine of any preceding clause, wherein the shape memory alloy or bi-metallic material is embedded into a body of the outlet guide vane.

The unducted single fan engine of any preceding clause, wherein the outlet guide vane is actively heated or cooled to cause the shape memory alloy or the bi-metallic material to cause the pitch, the camber, the lean angle, or the sweep to change.

The unducted single fan engine of any preceding clause, wherein the outlet guide vane is passively heated or cooled to cause the shape memory alloy or the bi-metallic material to cause the pitch, the camber, the lean angle, or the sweep to change.

An outlet guide vane for an engine may include an adjustable body having a portion configured to be moved or deformed, wherein a pitch, camber, lean angle, curvature, height, sweep, or combinations thereof, of the outlet guide vane is controlled via movement of the portion of the adjustable body or deformation of the portion of the adjustable body.

The outlet guide vane of any preceding clause, wherein the portion of the adjustable body is deformed to change the pitch, camber, lean angle, curvature, height, sweep, or combinations thereof, of the outlet guide vane.

The outlet guide vane of any preceding clause, wherein the portion of the adjustable body is moved with respect to a remainder of the adjustable body to change the pitch, camber, lean angle, curvature, height, sweep, or combinations thereof, of the outlet guide vane.

The outlet guide vane of any preceding clause, further comprising a shape memory alloy embedded in the adjustable body, the shape memory alloy being configured to deform the portion of the adjustable body.

The outlet guide vane of any preceding clause, wherein the portion is a proplet of the outlet guide vane, and wherein the proplet is deformed in a manner that adjusts a radial height of the outlet guide vane.

The outlet guide vane of any preceding clause, wherein two or more of pitch, camber, lean angle, curvature, height, or sweep of the outlet guide vane are controlled simultaneously.

The outlet guide vane of any preceding clause, wherein the outlet guide vane is passively heated or cooled to deform the portion of the adjustable body and to cause at least one of the pitch, the camber, the lean angle, or the sweep to change.

The outlet guide vane of any preceding clause, further comprising an actuation device within the outlet guide vane, the actuation device being configured to actuate the movement or deformation of the portion of the adjustable body.

The outlet guide vane of any preceding clause, wherein the actuation device is one or more of a mechanical actuation device, an electrical actuation device, a bi-metallic actuation device, a shape memory alloy, a hinge, a motor, and a torque tube.

The outlet guide vane of any preceding clause, wherein the actuation device comprises a shape memory alloy or a bi-metallic material, and wherein the outlet guide vane is actively or passively heated or cooled to deform the portion of the adjustable body and to cause at least one of the pitch, the camber, the lean angle, or the sweep to change.

The outlet guide vane of any preceding clause, wherein the adjustable body comprises a leading edge and a trailing edge, and wherein the portion includes the leading edge such that the leading edge is configured to be moved with respect to the trailing edge about a movement axis.

The outlet guide vane of any preceding clause, wherein the leading edge is configured to extend along an entire span of the outlet guide vane.

The outlet guide vane of any preceding clause, wherein the leading edge is configured to extend a partial distance along a span of the outlet guide vane.

The outlet guide vane of any preceding clause, further comprising an actuation device, wherein the leading edge is configured to move with respect to the trailing edge via the actuation device.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. An unducted single fan engine comprising:
   (a) a housing having:
      (i) one or more fan blades coupled to the housing and configured to rotate circumferentially; and
      (ii) one or more outlet guide vanes coupled to the housing, each of the one or more outlet guide vanes comprising a leading edge portion having a variable leading edge; and
   (b) one or more actuation devices coupled to each of the one or more outlet guide vanes, the one or more actuation devices configured to control the variable leading edge of the respective outlet guide vane,
   wherein the variable leading edge is controllable to vary a pitch, camber, lean angle, curvature, height, or sweep of the respective outlet guide vane, and
   wherein the variable leading edge and the leading edge portion are movable with respect to a remaining, main portion of the outlet guide vane about a movement axis.

2. The unducted single fan engine of claim 1, wherein the housing includes a spinner configured to rotate about a centerline of the unducted single fan engine and a nacelle coupled to the spinner, wherein the one or more fan blades are configured to rotate with the spinner.

3. The unducted single fan engine of claim 1, wherein the one or more actuation devices are embedded within the one or more outlet guide vanes.

4. The unducted single fan engine of claim 1, wherein the leading edge portion extends along at least a portion of a chord length of the respective outlet guide vane, along at least a portion of a span length of the respective outlet guide vane, or along at least a portion of both the chord length and the span length.

5. The unducted single fan engine of claim 1, wherein the one or more actuation devices effectuate (i) twisting of the leading edge portion of the respective outlet guide vane, (ii) proplet curvature control of the leading edge portion of the respective outlet guide vane, (iii) rotation or hinging of the leading edge portion of the respective outlet guide vane, (iv) or combinations thereof.

6. The unducted single fan engine of claim 1, wherein the variable leading edge is configured to be moved during operation of the unducted single fan engine, and wherein a position of the variable leading edge is based upon an operating state of the unducted single fan engine.

7. The unducted single fan engine of claim 1, wherein the variable leading edge is a proplet and wherein the one or more actuation devices is configured to control the proplet to vary the curvature and the height of the respective outlet guide vane.

8. The unducted single fan engine of claim 1, wherein the one or more actuation devices are one or more of a mechanical actuation device, an electrical actuation device, a bi-metallic actuation device, a shape memory alloy, a hinge, a motor, ora torque tube.

9. The unducted single fan engine of claim 1, wherein the one or more actuation devices are a shape memory alloy or a bi-metallic material, and wherein the shape memory alloy or bi-metallic material is embedded into a body of the respective outlet guide vane.

10. An outlet guide vane for an engine, the outlet guide vane comprising:
    an adjustable body having a portion configured to be moved or deformed,
    wherein (i) the portion of the adjustable body is deformed to change a pitch, camber, lean angle, curvature, height, sweep, or combinations thereof, of the outlet guide vane or (ii) the portion of the adjustable body is moved with respect to a remainder of the adjustable body to change a pitch, camber, lean angle, curvature, height, sweep, or combinations thereof, of the outlet guide vane.

11. The outlet guide vane of claim 10, wherein the portion is a proplet of the outlet guide vane, and wherein the proplet is deformed in a manner that adjusts a radial height of the outlet guide vane.

12. The outlet guide vane of claim 10, wherein two or more of pitch, camber, lean angle, curvature, height, or sweep of the outlet guide vane are controlled simultaneously.

13. The outlet guide vane of claim 10, wherein the outlet guide vane is passively heated or cooled to deform the portion of the adjustable body and to cause at least one of the pitch, the camber, the lean angle, or the sweep to change.

14. The outlet guide vane of claim 10, further comprising an actuation device within the outlet guide vane, the actuation device being configured to actuate the movement or deformation of the portion of the adjustable body, wherein the actuation device is one or more of a mechanical actuation device, an electrical actuation device, a bi-metallic actuation device, a shape memory alloy, a hinge, a motor, or a torque tube.

15. The outlet guide vane of claim 10, wherein the adjustable body comprises a leading edge and a trailing edge, and wherein the portion includes the leading edge such that the leading edge is configured to be moved with respect to the trailing edge about a movement axis.

16. The outlet guide vane of claim 15, wherein the leading edge is configured to extend at least a partial distance along a span of the outlet guide vane.

17. The outlet guide vane of claim 15, further comprising an actuation device, wherein the leading edge is configured to move with respect to the trailing edge via the actuation device.

18. An outlet guide vane for an engine, the outlet guide vane comprising:
- an adjustable body having a portion configured to be moved or deformed,
- wherein a pitch, camber, lean angle, curvature, height, sweep, or combinations thereof, of the outlet guide vane is controlled via movement of the portion of the adjustable body or deformation of the portion of the adjustable body, and
- wherein two or more of pitch, camber, lean angle, curvature, height, or sweep of the outlet guide vane are controlled simultaneously.

19. The outlet guide vane of claim 18, further comprising an actuation device within the outlet guide vane, the actuation device being configured to actuate the movement or deformation of the portion of the adjustable body, wherein the actuation device is one or more of a mechanical actuation device, an electrical actuation device, a bi-metallic actuation device, a shape memory alloy, a hinge, a motor, or a torque tube.

20. The outlet guide vane of claim 18, wherein the adjustable body comprises a leading edge and a trailing edge, and wherein the portion includes the leading edge such that the leading edge is configured to be moved with respect to the trailing edge about a movement axis.

* * * * *